(12) United States Patent
Middler et al.

(10) Patent No.: US 9,468,873 B2
(45) Date of Patent: Oct. 18, 2016

(54) FILTERING DEVICE FOR FLUIDS

(75) Inventors: Robert Middler, Havixbeck (DE); Stefan Wöstmann, Sassenberg (DE)

(73) Assignee: Nordson Corporation, Westlake, OH (US)

( * ) Notice: Subject to any disclaimer, the term of this patent is extended or adjusted under 35 U.S.C. 154(b) by 476 days.

(21) Appl. No.: 14/128,849

(22) PCT Filed: Jun. 19, 2012

(86) PCT No.: PCT/EP2012/061755
§ 371 (c)(1),
(2), (4) Date: Apr. 25, 2014

(87) PCT Pub. No.: WO2013/000772
PCT Pub. Date: Jan. 3, 2013

(65) Prior Publication Data
US 2014/0263028 A1   Sep. 18, 2014

(30) Foreign Application Priority Data

Jun. 27, 2011   (DE) .................. 10 2011 051 373

(51) Int. Cl.
*B01D 29/68* (2006.01)
*B29C 47/00* (2006.01)
(Continued)

(52) U.S. Cl.
CPC ........... *B01D 29/68* (2013.01); *B29C 47/0886* (2013.01); *B29C 47/682* (2013.01); *B29C 47/0007* (2013.01); *B29C 47/0014* (2013.01); *B29C 47/686* (2013.01)

(58) Field of Classification Search
None
See application file for complete search history.

(56) References Cited

U.S. PATENT DOCUMENTS

| 5,308,484 | A | 5/1994 | Bacher et al. |
| 5,578,206 | A | 11/1996 | Ogoshi |
| 7,419,592 | B2 | 9/2008 | Middler et al. |

FOREIGN PATENT DOCUMENTS

| DE | 19500060 C1 | 11/1995 |
| DE | 19800744 A1 | 5/1999 |

(Continued)

OTHER PUBLICATIONS

English translation of the International Search Report and Written Opinion of International Patent Application No. PCT/EP2012/061755, mailed Sep. 24, 2012, 7 pages.

(Continued)

*Primary Examiner* — Benjamin Kurtz
(74) *Attorney, Agent, or Firm* — Baker & Hostetler LLP

(57) ABSTRACT

The invention relates to a filtering device (100) comprising: a filter support element (10) which is movably mounted in the housing (30), which has the shape of a cylindrical bolt, and which has multiple filter chambers (11.1, 11.2; 12.1, 12.2), a filtering element being arranged in each said filter chamber; and an inlet channel (31.1, 31.2 32.1, 32.2) and an outlet channel (41.1, 41.2; 42 0.1, 42.2) in the housing (30), wherein the inlet channel and the outlet channel are each to be connected to at least one filter chamber in a production position. The aim of the invention is to increase the effective filtering surface. This is achieved in that at least two pairs of filter chambers are provided on the filter support element. The filter chambers of each pair are arranged on the filter support element in a diametrically opposed manner, and there are no connections between the filter chambers within the filter support element. At least one respective intermediate channel (13.1, 13.2, 14.1, 14.2) that extends in the direction of the longitudinal axis (19) of the filter support element (10) is provided between the outlet channels in the housing and the filter chambers. Intermediate channels of different lengths are provided for each pair of filter chambers.

13 Claims, 15 Drawing Sheets

(51) Int. Cl.
*B29C 47/08* (2006.01)
*B29C 47/68* (2006.01)

(56) References Cited

FOREIGN PATENT DOCUMENTS

| | | | |
|---|---|---|---|
| DE | 10254022 | A1 | 3/2004 |
| EP | 0250695 | A1 | 1/1988 |
| EP | 0915729 | A2 | 5/1999 |
| JP | 2009160935 | A | 7/2009 |
| WO | 9201500 | A1 | 2/1992 |
| WO | 0216113 | A2 | 2/2002 |

OTHER PUBLICATIONS

International Preliminary Report on Patentability for International Application No. PCT/EP2012/061755, mailed Jan. 7, 2014, 15 pages.
Japanese Application No. 2014-517595: Decision of Grant dated Apr. 25, 2016, 3 pages.
English-language abstract for EP0250695 (EREMA).
English-language abstract for DE19500060 (Kreyenborg Verwaltungen).
English-language abstract for DE19800744 (Kreyenborg Verwaltungen).
PCT International Search Report dated Sep. 24, 2012 for PCT/EP2012/061755, from which the instant application is based, 3 pages.

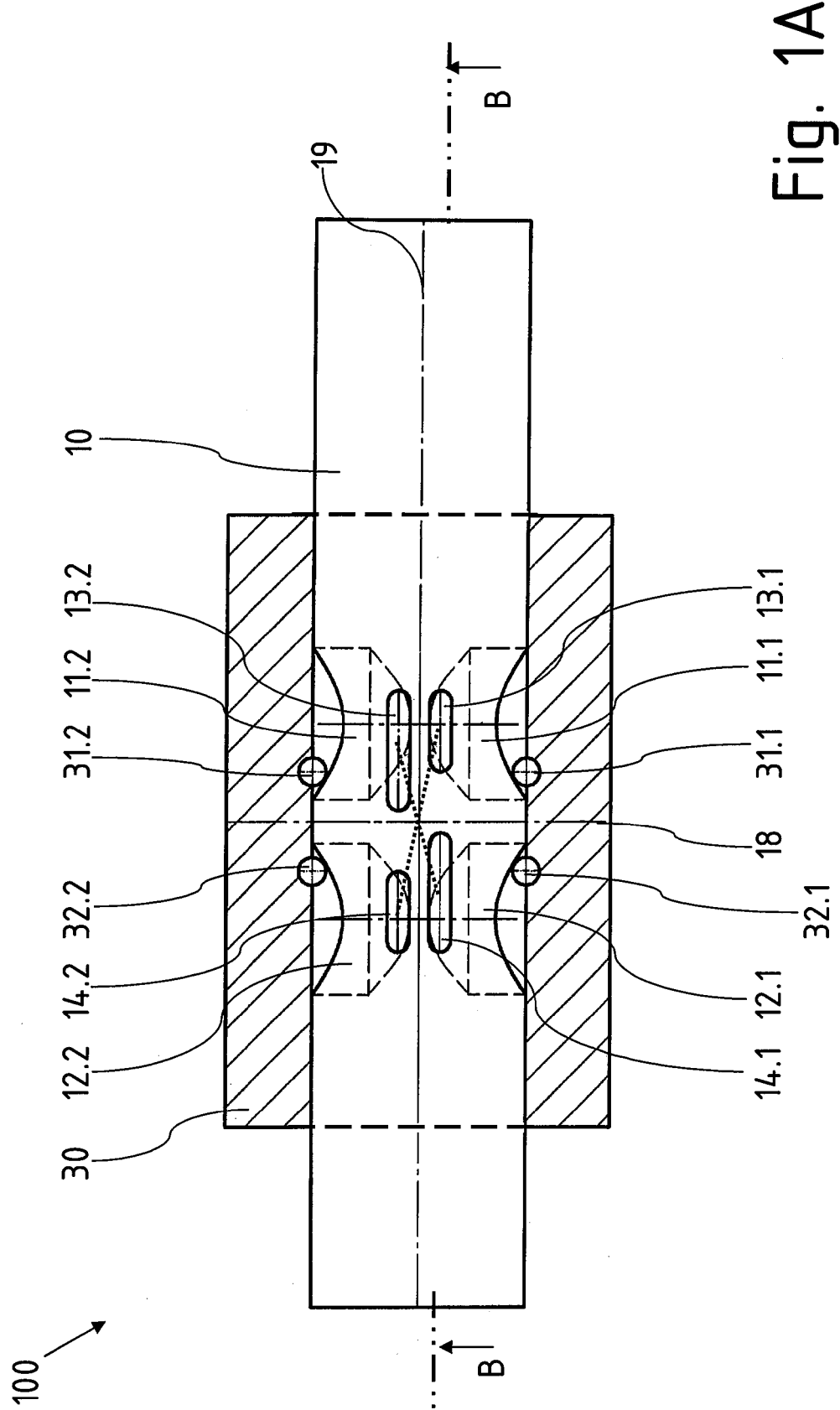

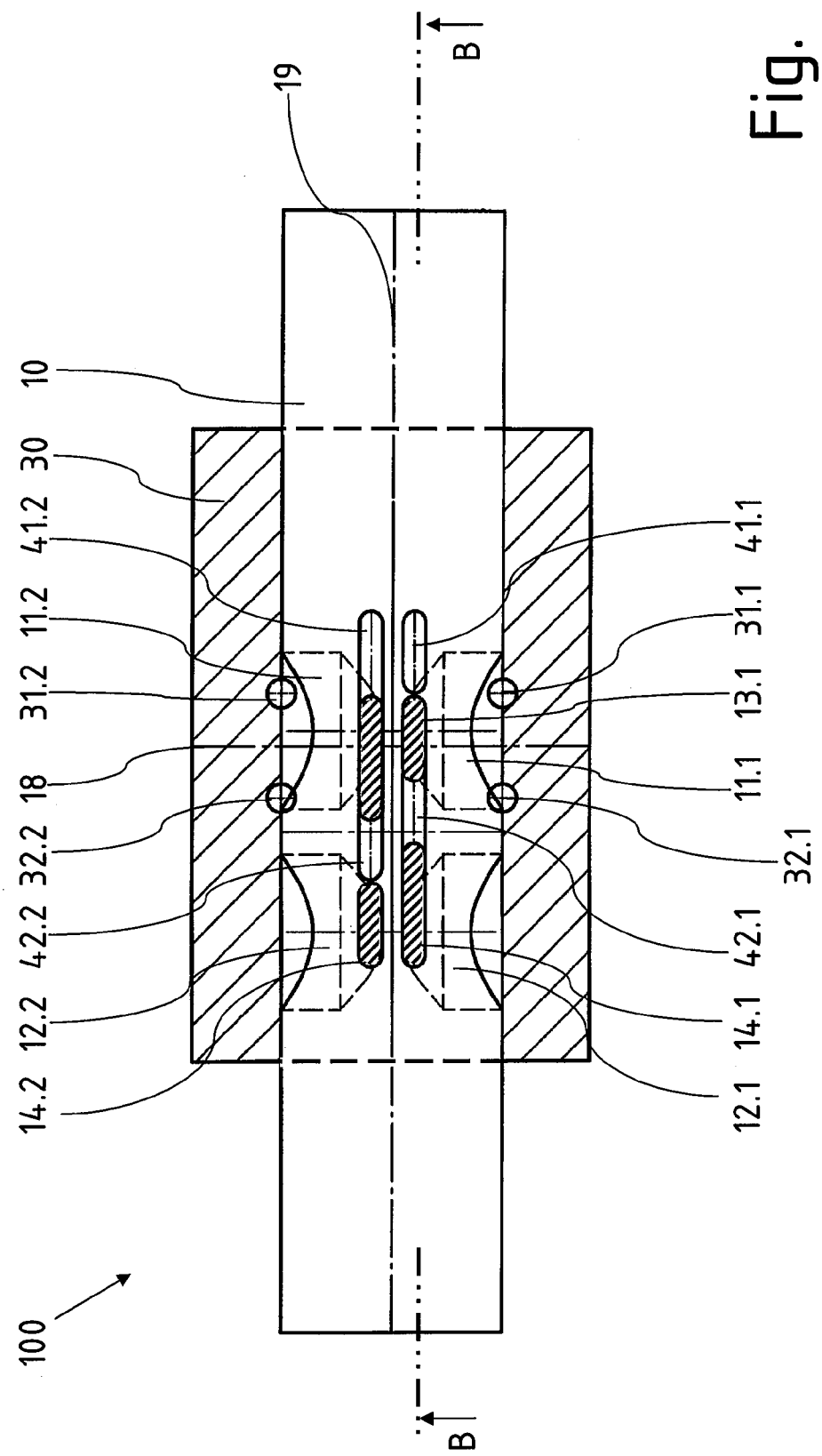

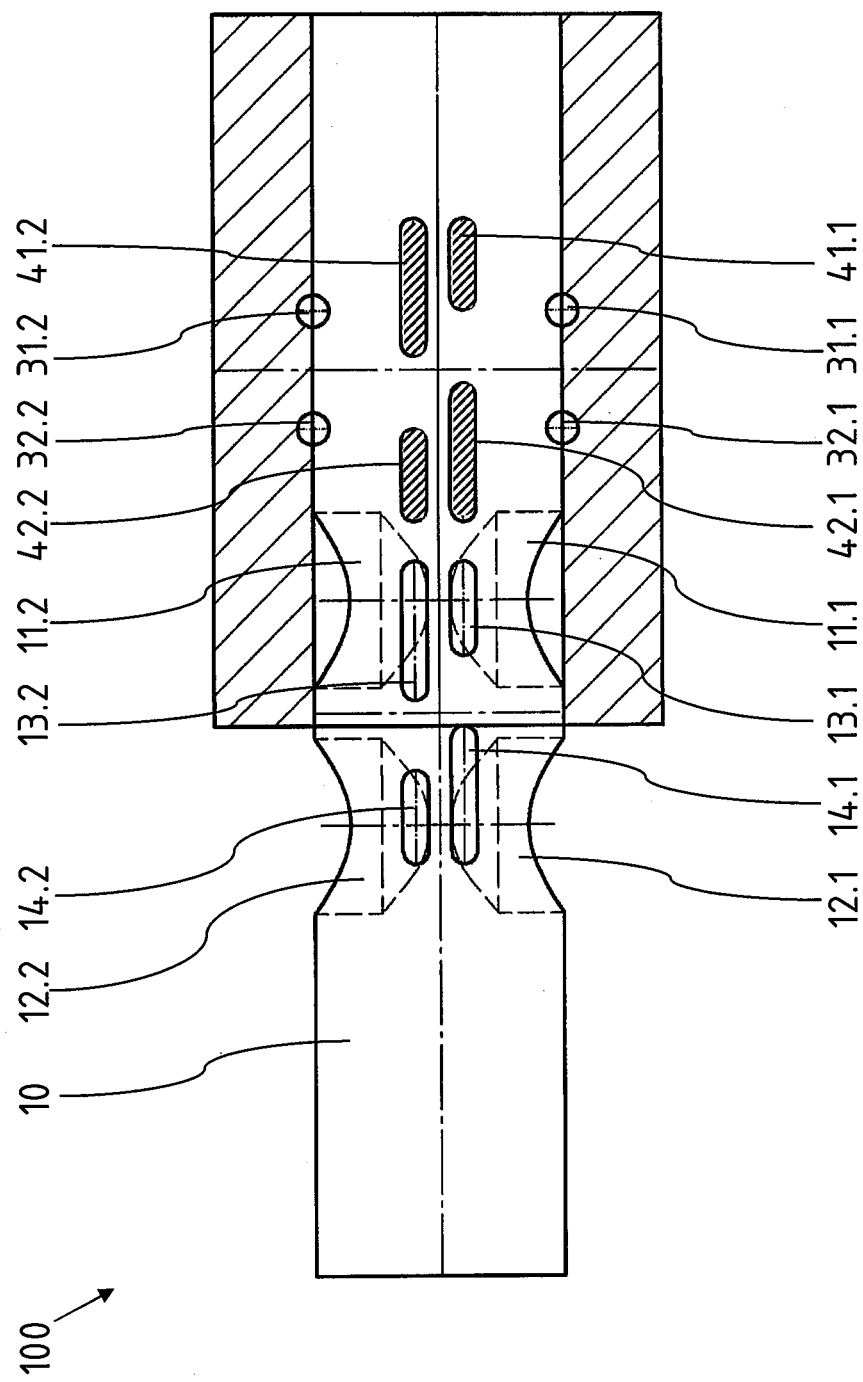

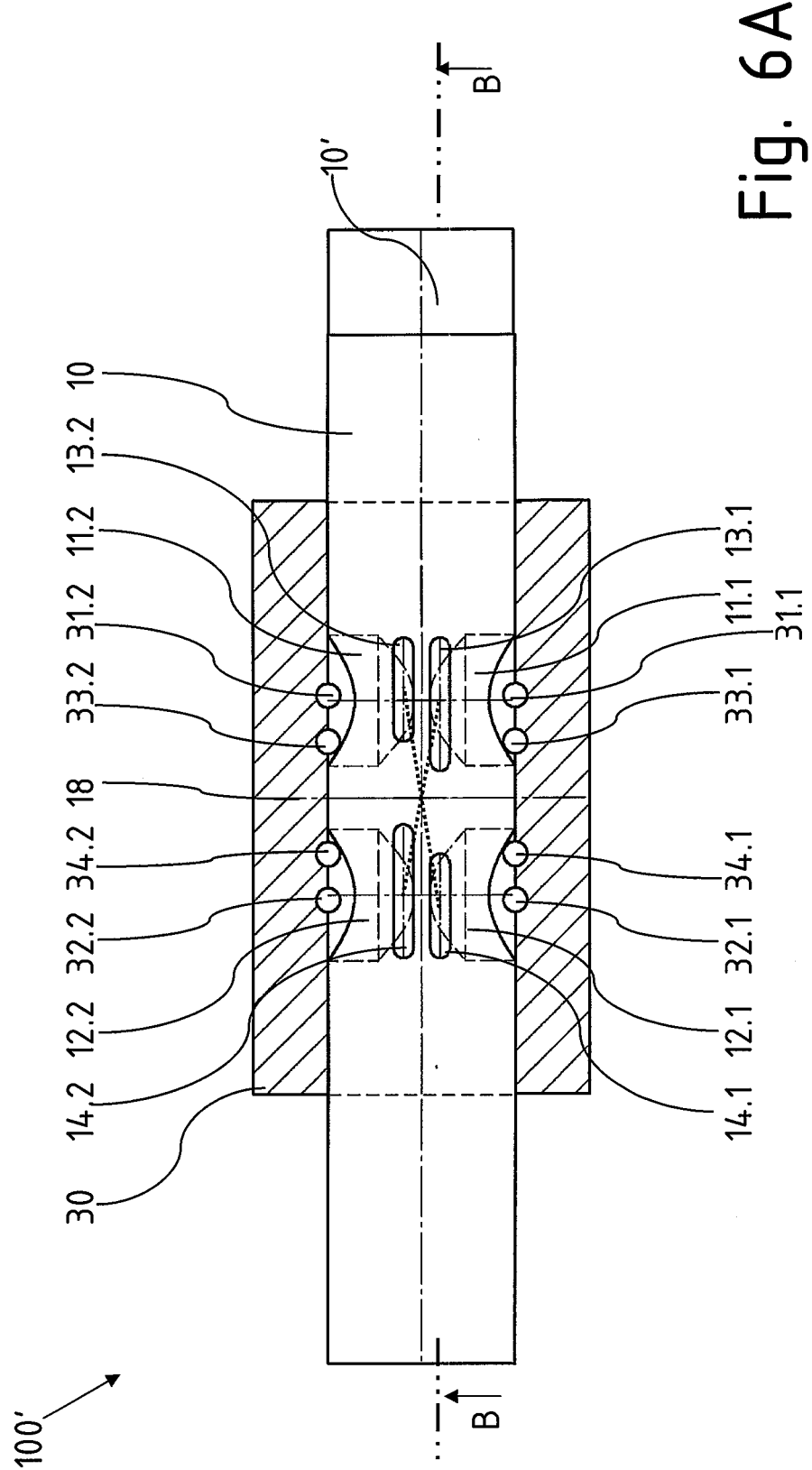

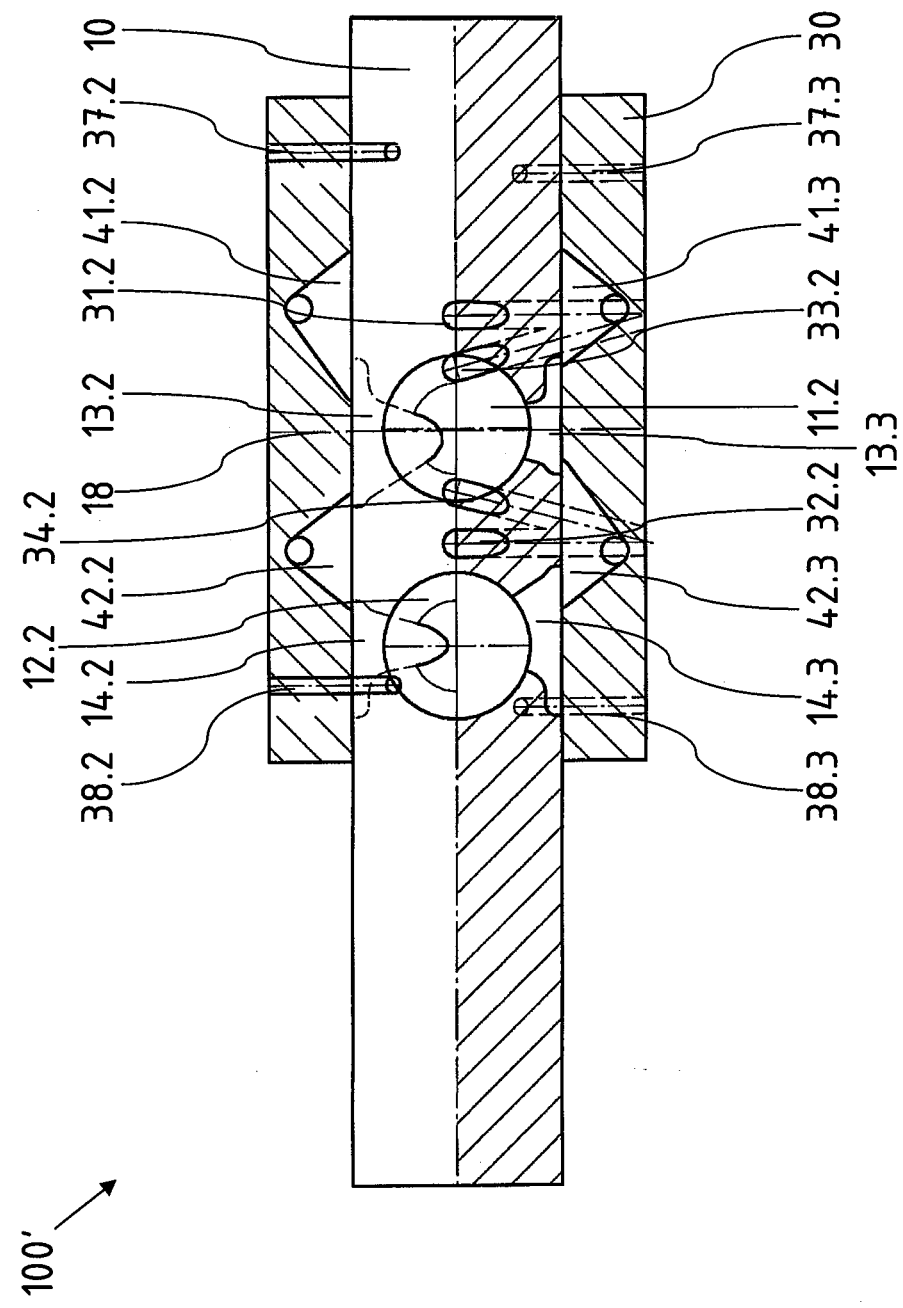

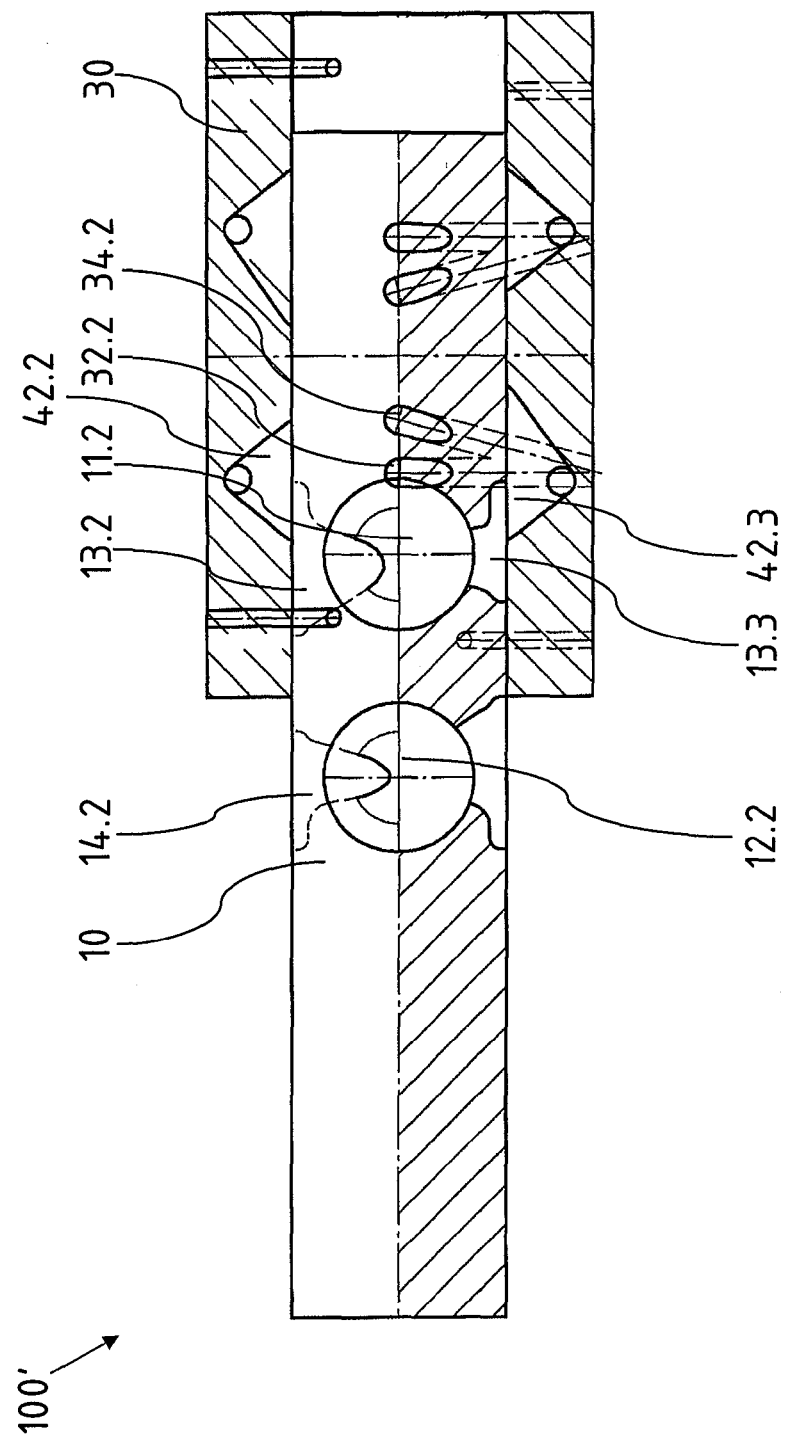

US 9,468,873 B2

FILTERING DEVICE FOR FLUIDS

CROSS-REFERENCE TO RELATED APPLICATIONS

This application is a 35 U.S.C. 371 national stage filing from International Application No. PCT/EP2012/061755 filed 19 Jun. 2012, which claims priority to German Application No. 102011051373.6 filed 27 Jun. 2011, the teachings of each of which are incorporated herein by reference.

TECHNICAL FIELD

The invention relates to a filtering device for fluids with a housing and with at least:
- a filter support element, which has the shape of a cylindrical bolt, that is movably mounted in a housing and which has multiple filter chambers, a filtering element being arranged in each said filter chamber,
- an inlet channel and an outlet channel in the housing, which are each to be connected to at least one filter chamber in production position, whereby in a production setting of the filter support element at least one inlet channel in the housing leads to each filter chamber and at least one outlet channel in the housing, respectively, leads away from each filter chamber.

BACKGROUND

Such filter devices are particularly used for the filtration of polymer meltings and liquids. The fluid is led through filter chambers, each of which comprises at least one respective filter element which eliminates dirt, contaminants or conglomerates contained in the fluid. When the filter element is contaminated, it has to be replaced, for which purpose the filter support element, which is movably mounted in a bore hole in the housing, can be shifted to a filter replacement position.

From DE 102 54 022 a filtering device is known which comprises two filter support elements with two respective filter positions. When one filter support element is shifted to a maintenance position in order to clean the filter chamber and the filter element, the filters of the other filter support element are available for filtration. By skillfully guiding the inlet and outlet channels in the housing it is even possible to accomplish a filtration on the filter support element which is in the maintenance position when using the filter chamber that is currently not maintained, so that at least 75 percent of the filter surface are constantly available, while in the other filter element back flushing takes place, in that fluid is led through the filter element from the clean side, which is then discharged to the outside with all adhering contaminations via a back-flush channel.

In order to increase the achievable flow capacity, or the filterable fluid volume per time, with the filter device, it is generally necessary to increase the filter surface. For this, it is possible to increase the size of the entire filtering device which, however, considerably increases the costs. There are other approaches for using filter units, by means of which it is possible with the use of stacked filter discs to provide larger filter surfaces while the filter chambers have the same opening areas. However, the latter units are not suited for all kinds of liquids to be filtered.

Another problem involves the processing of sensitive fluids, which change chemically during longer dwell times, in particular when they flow into the gap between the filter support element and the bore hole of the housing. For example, there is even the danger of explosion in the processing of so-called textile pulp for synthetic fibers, when fluid residues stagnate locally for such a long time, that they can react with iron atoms dissolved from the filtering device. Therefore, EP 915 729 B1 suggests to adjust the filter support and the bore hole of the housing in such a way that a flow-gap is formed between the two. To ensure that the filter support stays in the center of the bore hole and is not pressed by the dynamic pressure to one side of the outlet channel, special distance holder elements are provided on the filter support element.

SUMMARY

Thus, the first general objective should be to increase the flow capacity of a filtering device of the previously described kind and, at the same time, to reduce particularly the local dwell time of fluid particles.

This objective is accomplished by means of a filter device with the characteristics of claim 1.

Because of the fact that, according to the invention, pairs of filter chambers are provided on diametrically opposite sides of the filter support element, the filter surface and thus the flow capacity can be doubled.

According to the invention, the additional filter chambers are not simply arranged in sequential order on the filter support element, but opposite to each other. Therefore, there is still the possibility that the filter support element can be shifted to one side or the other side into a maintenance position, which is a possibility generally known from the prior art. However, now not all filter chambers are separated from the production flow, but only particular ones.

According to the invention, this becomes possible because of the fact that the filter chambers are designed without any connection within the filter support element, and because of a special design of the channels by means of which the fluids are discharged again:

Between the outlet channel in the housing and the filter chambers at least one intermediate channel has been provided, respectively, which is extending in the direction of the longitudinal axis of the filter support element, whereby each pair of the filter chambers is designed with intermediate channels of varying length, by means of which:
- in a production position of the filter support element, both filter chambers of one pair are respectively connected to the inlet channels and the outlet channels and
- in different axial maintenance positions of the filter support element in the housing, one or the other filter chamber of a pair can be connected reciprocally with at least one outlet channel.

These intermediate channels extend the outlet channels at the transition from the filter support element to the housing, in particular their portion in the housing itself and/or the part which reaches from the outside surface into the actual filter chamber.

Such intermediate channels can also be arranged on the outside surface of the filter support element and at the same time on the inside wall of the bore hole in the housing of the filter support element. However, it is only important that more than one position with an overlap and an open outlet channel are available between the intermediate channel in the filter support element and the intermediate channel in the housing:

In addition to a regular production position where the outlet channel is open for both filter chambers of one pair, both filter chambers have at least one respective maintenance position, at which the outlet channel is only open for one, but not for the other filter chamber of the pair.

In order to accomplish this, it may be possible to have a continuous overlap on the particular shifting path of the filter support element. But specific overlaps at the respective relevant axial positions may also be enough. Thus, the intermediate channels may not only be formed by oblong grooves, but, for example, also by rows of bore holes.

Preferably two filter support elements are arranged in the housing and each filter support element consists of two pairs of filter chambers. As a result, this filtering device provides a total of eight filter chambers for the regular production, from which, depending on the further construction type described below, 50 percent or 75 percent are still usable for retaining the filtering process, even in the maintenance positions.

However, this invention-based arrangement not only has advantages in connection with an increase of the flow capacity volume, because arranging the filter chambers on opposite sides of the filter support element also has a positive effect in that the filter chambers are flooded from opposite sides, and the fluid is discharged from outlet channels that are set at an angle of 90° in relation to the inlet level.

Despite extremely tight production tolerances, low viscosity fluids will still be able to flow into the gap between the outer surface of the filter support element and the inside wall of the bore hole in which the filter support element is inserted. In cross section and with distortion of the actual sizes, the filter support element, which is displayed by a smaller circle in cross section, tumbles figuratively speaking within the bore hole of the housing, which has a respectively larger circle in cross section. From the prior art it is known that the one-sided flow presses the filter support element to one side of the bore hole. This results in a partial sealing in the area of contact, which prevents a quick discharge of the leakage flows.

Because of the fact that, according to the invention, the incident flow occurs from both sides and an even pressure exists in the inlet channels in the housing because they are interconnected, the filter support element is kept in balance.

In preferred embodiments, this effect is extended in that the balance can be comprised of several degrees of freedom and there are constant pressure conditions all along the circumference of each filter support element, so that the filter support element is basically held in the balance within the bore hole, and as a result an equal clearance is maintained not only across the entire circumference, but also on all axial positions. Consequently, leakage flows can be discharged quickly and thus the preferred embodiments described below are even suitable for the processing of explosive textile pulp:

For the production of constant pressure conditions, it is preferred in the cross section level,
   that at least one inlet channel leads to each filter chamber at opposite sides of the filter support element, respectively, whereby the symmetrical axis of the group of inlet channels or of their outlet areas is arranged on a first diametrical line, and
   that two respective outlet channels lead from each filter chamber to opposite sides of the filter support element, whereby the symmetrical axis of the outlets of the group of outlet channels is arranged on a second diametrical line, which extends perpendicular to the first diametrical line.

This results in a balance of pressure and forces, respectively, within the level of incoming and outgoing fluids. If, for example, the inlet level is horizontal, then the outlet level is perpendicular to that.

Preferably, the fluid is discharged simultaneously to the diametrically opposite sides of the filter support element, so that it also produces a balance in the second coordinate of the cross sectional plane.

It is further preferred that the two filter support elements with two respective pairs of filter chambers are to be arranged on each filter support, whereby in particular:
   the outlets of the group of inlet channels leading to the filter chambers of both pairs are arranged mirror-symmetrically in relation to the first transverse axis of the housing,
   the respectively longer intermediate channels and the shorter intermediate channels of both pairs are arranged on different sides of a first transverse axis and at the same time alternately on different sides of a longitudinal axis of the filter support element, and
   the connecting lines of the centers of the respective longer intermediate channels and of the respective shorter intermediate channels of both pairs intersect at the intersection point of the first transverse axis and the longitudinal axis.

By means of this arrangement all groups of similar channels are symmetrically arranged in relation to common center lines, respectively. Thus, not only pressure forces that influence the filter support element from the outside are in balance in the cross sectional plane. Also the channels which are not directly aligned toward the center axis of the filter support element are held in balance by means of a paired and equidistant arrangement in relation to the respective center axis. Asymmetrical pressure forces, which can result in a rotation of the filter support element around its middle axis, are thus prevented.

It is further preferred that the longitudinal axis of the filter support element is arranged parallel to a weight-force vector. Thus, a hanging arrangement is chosen in which the filter support element is moved vertically. This arrangement eliminates the influence of the weight-force on the position of the filter support element within the bore hole in the housing.

Subsequently, the invention is explained in more detail with reference to the drawings. The figures show in detail:

BRIEF DESCRIPTION OF THE DRAWINGS

FIG. 1A a filtering device according to a first embodiment in a production position in a first longitudinal cross section;

FIG. 4A a filtering device shortly before or after the back flush position in a first longitudinal cross section;

FIG. 5 the filtering device in a filter replacement position;

FIG. 6A a filtering device according to a second embodiment in production position in a first longitudinal cross section;

FIG. 7B the filtering device according to FIG. 7A in back flush position in a second longitudinal cross section;

FIG. 8B the filtering device according to FIG. 8A in back flush position in a second longitudinal cross section.

DETAILED DESCRIPTION

FIG. 1A displays the filtering device 100, which basically comprises a housing 30 and two cylindrical bolt-shaped filter support elements 10, which are movably mounted in two bore holes in the housing, as it is generally known. All figures feature only one respective filter support element 10; in the actual embodiment a further one is arranged in a level below or next to it, so that filtering can also be maintained if one of the filter support elements is in a maintenance position.

The housing 30 in FIG. 1A is displayed in a cross-sectional form. Viewed from the top, the filter support element 10 is shown in a cross-sectional bore hole of the housing.

Figure 8A:
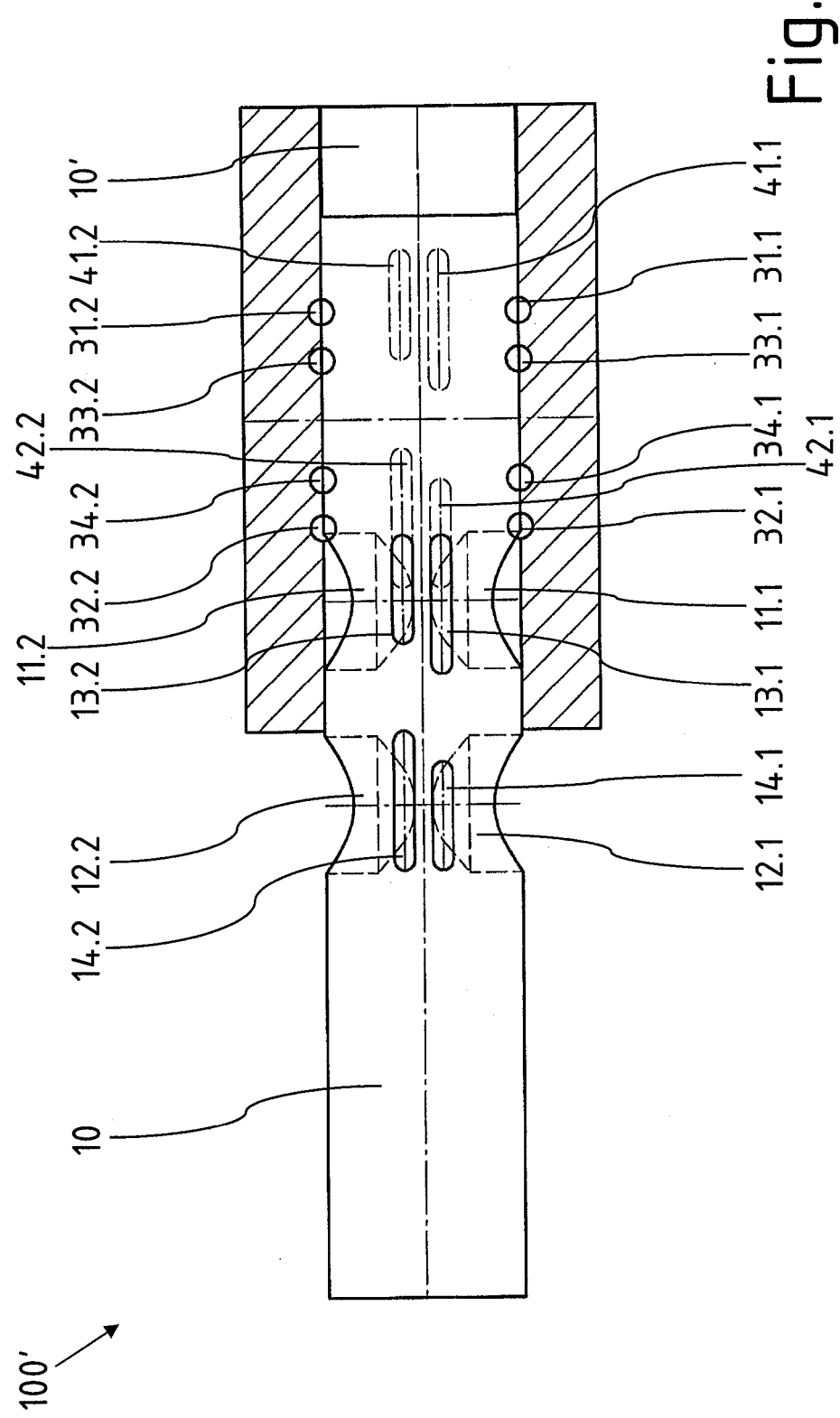
FIG. 8A the filtering device in a filter replacement position in a first longitudinal cross section.
Figure 9:
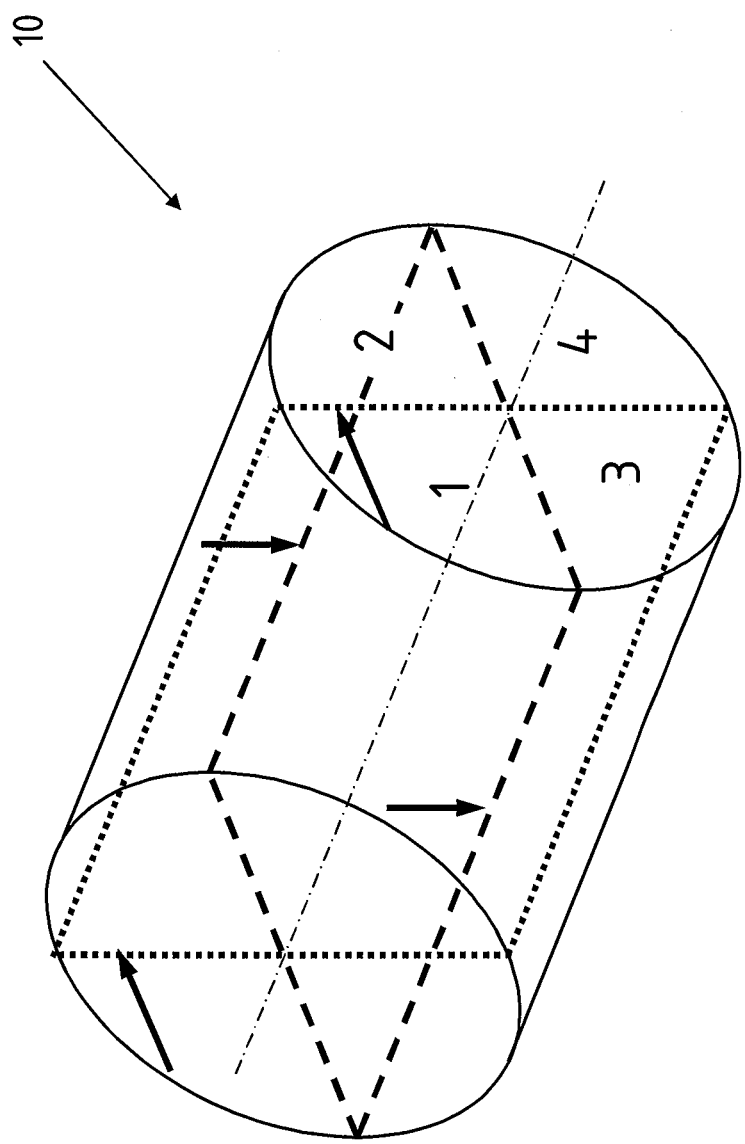
FIG. 9 a schematic perspective view of a filter support element for marking the position of the sectional planes and of the reference sign indices.

FIG. 9 indicates the locations of the subsequently used sectional planes, and the use of the indices in the following description. In the figures, where a number includes the letter "A" as well as in FIGS. 5 and 8, the sectional plane is situated in such a way, as it is suggested by the dashed lines; i.e., the sectional plane is viewed from the top.

In the figures, where a number includes the letter "B", the sectional plane is offset by 90°, as it is suggested by the dotted lines; i.e., the sectional plane is viewed from the left to the right.

The numbers on the front surface identify the respective quadrants, which are formed by the division of the two sectional planes. Subsequently, they are added as indexes to the respective reference numbers, in order to indicate the position of similar characteristics. The reference sign "filter chambers 11.1, 12.1", for example, refers to filter chambers which are located in the first quadrant according to the display in FIG. 9, whereby, for example, "filter chambers 11.2, 12.2" refer to those located next to these in the second quadrant.

The embodiment according to FIG. 1 displays a preferred embodiment of the invention, in which constant pressure conditions exists, which means that the filter support element 10 is held in balance in all possible spatial directions in the housing 30, in order to prevent any angular tilting and thus a resulting blockage of the annular gap between the filter support element 10 and the bore hole in the housing, which is the flowing path for leakage currents.

For a better depiction, the filter support elements in the figures are displayed in a horizontal position, respectively. But in order to produce constant pressure conditions, it is advantageous to set up the filtering device in actual production in such a way, that the longitudinal axes of the filter support elements are aligned vertically. As a result, the influences of mass forces are neutralized, and it is prevented that the gap between the filter support element and the housing is formed differently along the circumference.

In the direction of a longitudinal axis 19, the filter support element 10 can be moved in relation to the housing 30.

In the displayed embodiment two pairs of filter chambers 11.1, 11.2 or 12.1, 12.2 are incorporated in the filter support element 10. Both filter chambers 11.1, 11.2 or 12.1, 12.2 of each pair are arranged mirror-symmetrically opposed to each other in relation to the first transverse axis 19. The pairs of filter chambers 11.1, 11.2 or 12.1, 12.2, on the other hand, are arranged mirror-symmetrically in relation to a transverse axis 18. The transverse axis 18 does not necessarily have to divide the length of the filter support element 10 into halves; it can also be positioned eccentrically in the filter support element 10. The transverse axis 18 presents a symmetrical axis with reference to the arrangement of the pairs of filter chambers 11.1, 11.2 or 12.1, 12.2.

The filter chambers 11.1, 11.2 or 12.1, 12.2 are fed by means of inlet channels 31.1, 31.2, 32.1, 32.2, which lead through the housing 30 in such a way that they extend towards the filter support element 10 in a tangential way.

In the production position displayed in FIG. 1A, the ends of the inlet channels 31.1, 31.2, 32.1, 32.2 lead into the filter chambers 11.1, 11.2, 12.1, 12.2, in particular on the dirty side of the filter element used. The inlet channels 31.1, 31.2, 32.1, 32.2, respectively, have the same distance in relation to the transverse axis 38 in the housing, which creates a center axis of the arrangement of the filter chambers 11.1, 11.2 or 12.1, 12.2, and which lies congruent with the axis 18 of the filter support element 10 in one production position. The inlet channels 31.1, 31.2, 32.1, 32.2 are positioned opposite to each other on opposing sides of the filter support element 10. This arrangement leads to a balance of pressure and forces of the incoming flow towards the filter chambers.

An important aspect of the invention is also the alignment of the flow channels on the outlet side:

At the filter support element 10 itself, intermediate channels 13.1, 13.2, 14.1, 14.2 are arranged above each respective filter chamber 11.1, 11.2, 12.1, 12.2, which extend lengthwise in the direction of the longitudinal axis 19.

A longer intermediate channel 13.2, 14.1 and a shorter intermediate channel 13.1, 14.2 are arranged above and below the longitudinal axis 19, respectively. With regard to the transverse axis 18, on the other hand, a respective longer intermediate channel 14.1 is arranged to the left and a further intermediate channel 13.2 is arranged to the right of it. With the shorter intermediate channel 13.1, 14.2, the arrangement is exactly opposite. When connecting the centers of the respective longer intermediate channels 13.2, 14.1 and of the respective shorter intermediate channels 13.1, 14.2, then the connecting lines intersect, which is depicted by means of the dotted lines in FIG. 1A, exactly in the center point of the arrangement of the filter chambers 11.1, 11.2 or 12.1, 12.2, and thus in the intersection point of the longitudinal axis 19 and the transverse axis 18.

The provision of longer and shorter intermediate channels is necessary so that the filter chambers 11.1, 11.2 or 12.1, 12.2 can be continually flowed through in specific maintenance positions, which will be further addressed below. By means of the presently described point-symmetrical arrangement of the intermediate channels 13.1, 13.2, 14.1, 14.2, it is ensured that the forces that exerted on the filter support element 10 in production position are identical from all sides.

The outlet channels in the housing have the same cross sectional design as those of the intermediate channels 13.1, 13.2, 14.1, 14.2 and are located in the production position in FIG. 1A exactly above them, so that they are not visible in FIG. 1A.

Figure 1B:
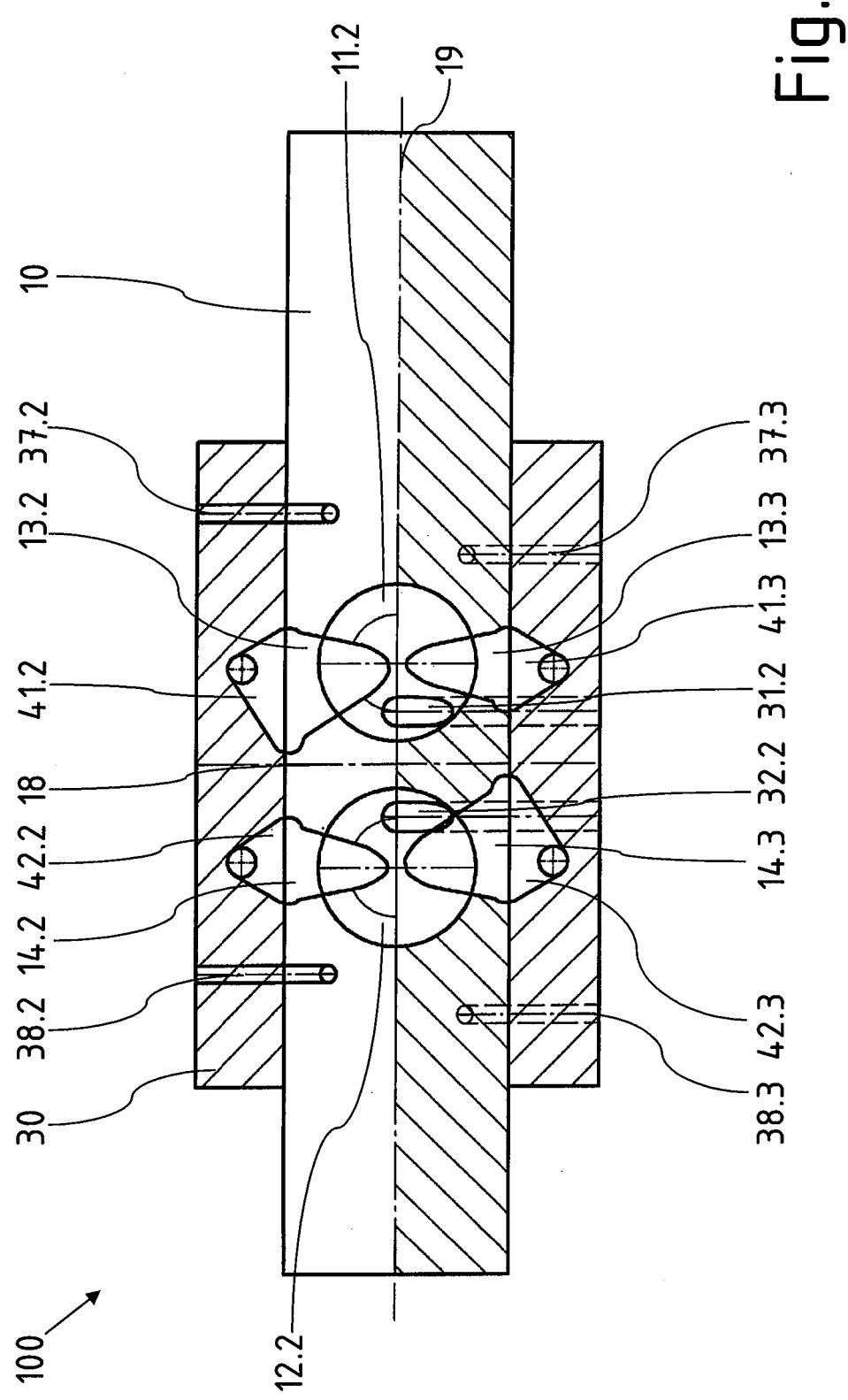
FIG. 1B the filtering device according to FIG. 1A in a second longitudinal cross section.

FIG. 1B displays the filtering device 100 according to the invention in a sectional plane that is shifted by 90°, marked by the B-B line in FIG. 1A.

The dashed lines clearly indicate how the inlet channels 31.1, 31.2 inside the housing intersect with the filter chambers 11.1, 11.2; the slotted hole-shaped intersection area is displayed with continuous lines, respectively.

Furthermore, back flush channels 38.2, 38.3, 37.2, 37.3 are shown, which lead through the housing 30 up to the filter support element 10, and which serve the purpose of leading fluids out on the dirty side of the filter elements when the filter support element 10 is located in the back flush position, shown and described below.

Finally, the depiction according to FIG. 1B highlights the formation of the intermediate channels 13.2, 13.3, 14.2, 14.3 in the filter support element 10 and of the outlet channels 41.2, 41.3, 42.2, 42.3 in the inside wall of the bore hole in housing 30.

A point-symmetrical arrangement is also achieved in this sectional plane: The arrangement of intermediate channels 13.2, 14.2, displayed in FIG. 1B on the upper side of the filter support element 10, is repeated below with the intermediate channels 13.3, 14.3, whereby also in this view, longer and shorter intermediate channels are arranged alternately on opposing sides of a transverse axis 18. So when the upper sequence is "long-short", then the lower one is "short-long".

The intermediate channels 13.2, 13.3, 14.2, 14.3 start about half way up the filter chambers 11.2, 12.2 and expand toward the upper side of the filter support element 10, so that they appear as slotted hole on the outside of the filter support element 10 (see FIG. 1A).

Complementary to this arrangement, the outlet channels 41.2, 41.3, 42.2, 42.3 are formed in the contact zone between the filter support element 10 and the bore hole of the housing. From there they taper down and end in cylindrical bore holes which lead out of the housing 30, as is illustrated in the embodiment of a filtering device 100.

As already mentioned earlier, in production position according to FIGS. 1A and 1B, the outlet channels 41.1, 41.2, 41.3, 42.1, 42.2, 42.3 are located congruent with the intermediate channels 13.1, 13.2, 14.1, 14.2 in the filter support element 10.

Figure 2:
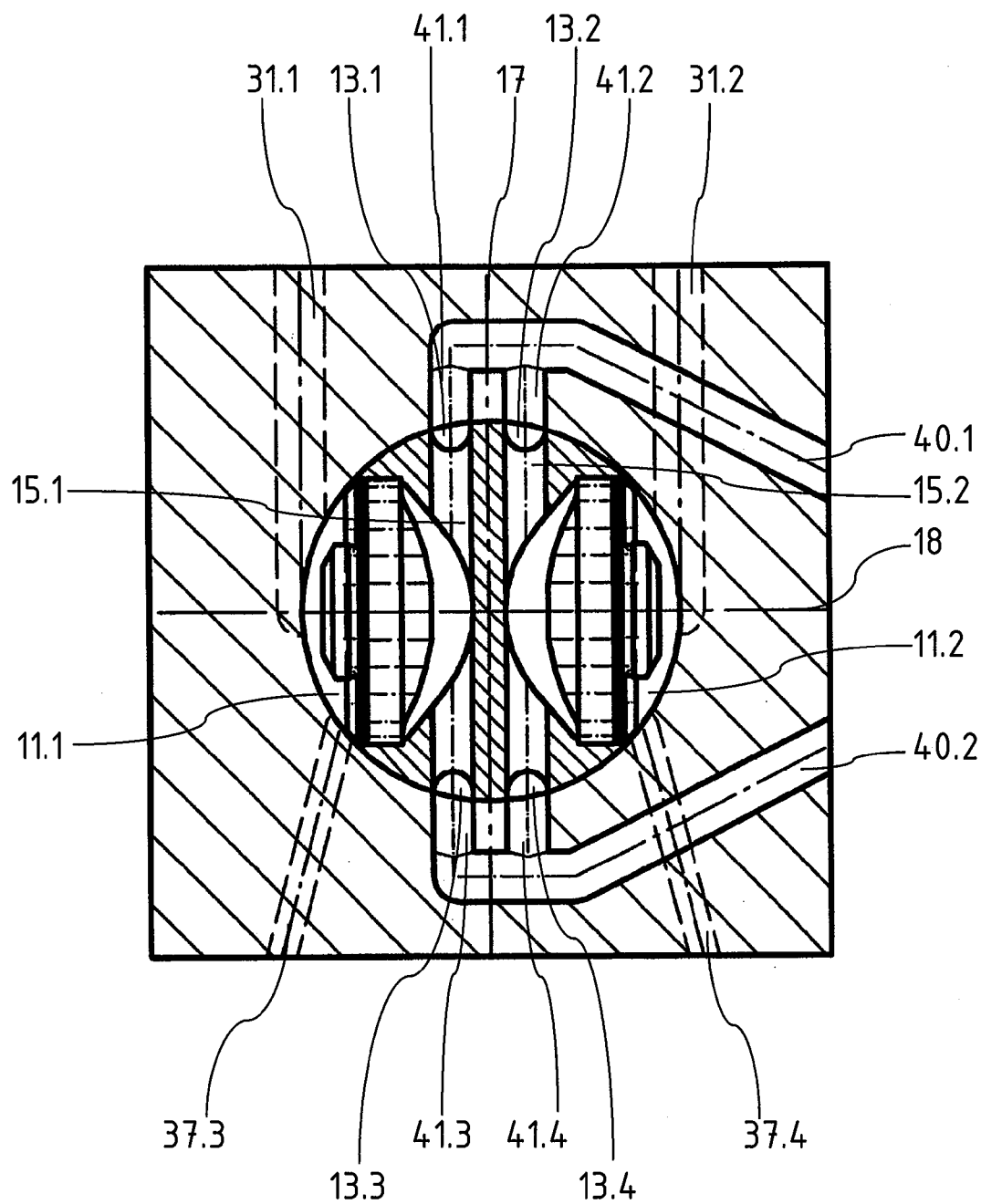
FIG. 2 the filtering device in a cross section.

FIG. 2 shows a cross section through the filtering device 100 in a sectional plane that is parallel to the transverse axis 18. As a result, it is easy to see the flow of the fluid:

The fluid flows through the inlet channels 31.1, 31.2 throughout the housing 30 and enters the filter chambers 11.1, 11.2, where it flows through the well-known filter elements, which can be designed, for example, as perforated plates covered with metal mesh.

In the filter support element 10, located behind the filter elements when viewed in flowing direction, the fluid flows into collecting channels 15.1, 15.2, which extend perpendicular to the inflow direction and which lead into the intermediate channels 13.1 . . . 13.4 above and below, respectively, which are parallel paired, but not of the same length in one pair, and which are formed into the outside surface of the filter support element 10.

In the housing, the intermediate channels 13.1 . . . 13.4 are located opposite of the outlet channels 41.1 . . . 41.4, which are combined deeper inside the housing into outlet channels 40.1, 40.2, which lead out of the housing 30.

The back flush channels 37.3, 37.4 are shown at the bottom, which lead from the central bore hole of the filter support element 10 out of the housing 30. In the position displayed in FIG. 2, they are only indicated, and there exists no connection between the back flush channels 37.3, 37.4 and the filter chambers 11.1, 11.2.

Similar to the depictions in FIGS. 1A and 1B, FIGS. 3A and 3B show, respectively, a filtering device 100 where the filter support element 10 was shifted along its longitudinal axis 19 in relation to the housing 30, in order to reach a back flush position.

Figure 3A:
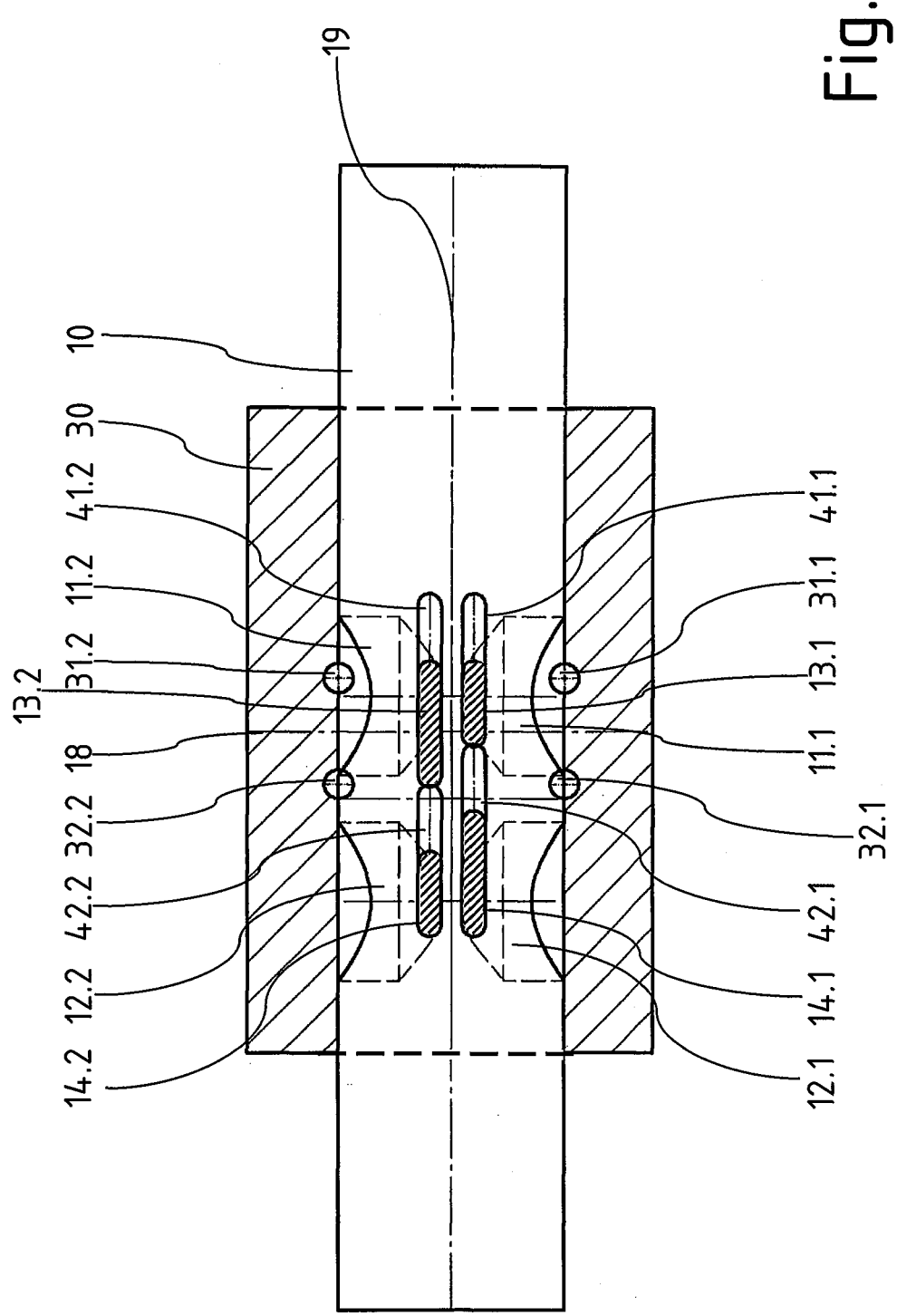
FIG. 3A a filtering device in back flush position in a first longitudinal cross section.

In FIG. 3A, the intermediate channels 13.1, 13.2, 14.1, 14.2 on the filter support element 10 are displayed in shaded manner, in order to distinguish them from the outlet channels 41.1, 41.2, 42.1, 42.2 on the side of the housing.

The connection to the individual filter chambers 11.1, 11.2, 12.1, 12.2 is provided as follows:

The upper left filter chamber 12.2 in FIG. 3A has no longer any connection with the inlet channel 32.2 on the dirty side. On the clean side the intermediate channel 14.2 slightly overlaps with the outlet channel 42.2.

Figure 3B:
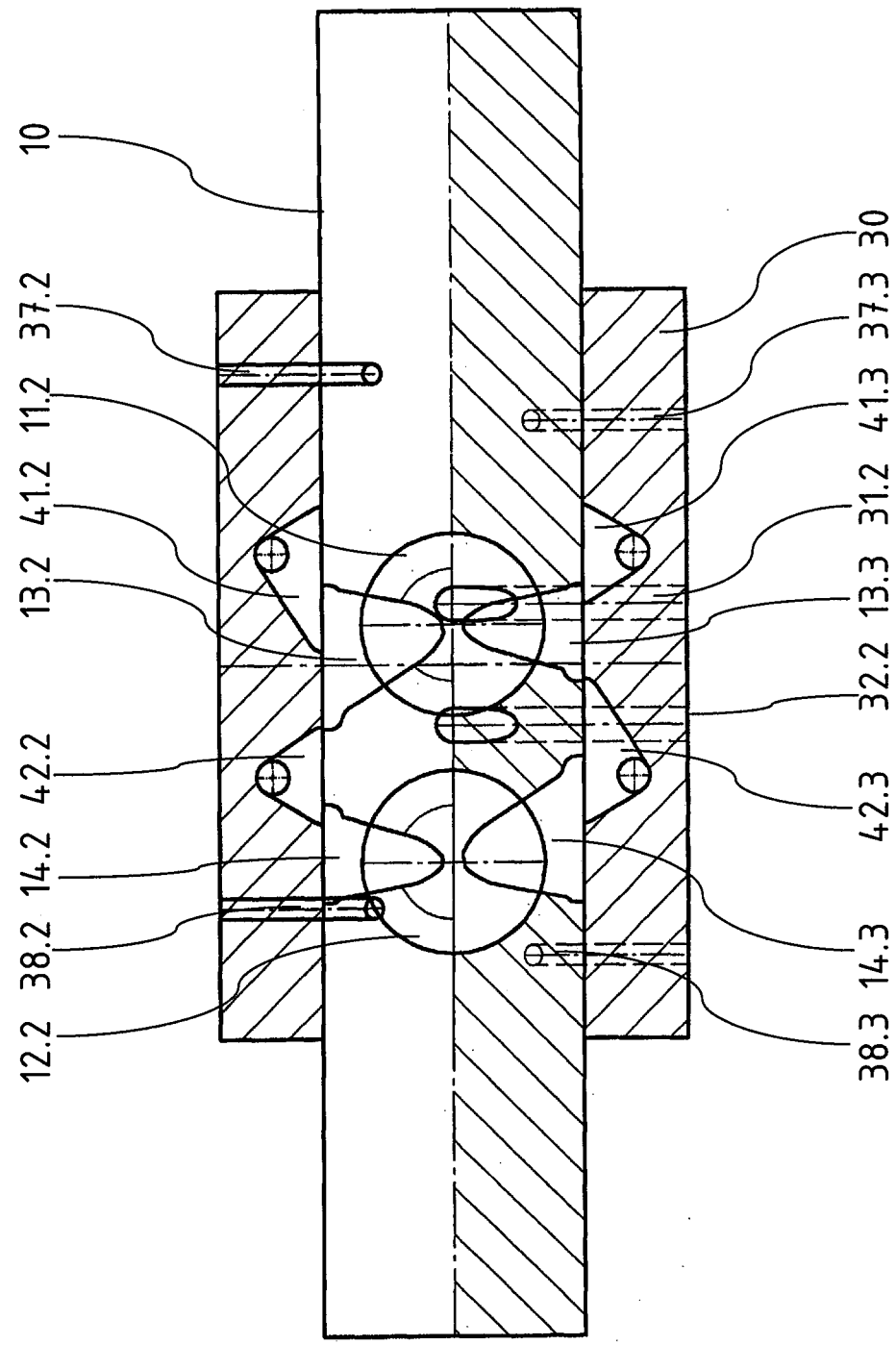
FIG. 3B the filtering device according to FIG. 3A in back flush position in a second longitudinal cross section.

As displayed in the sectional plane in FIG. 3B, which is shifted by 90°, there is a further overlapping of the upper rear back flush channel 38.2 with the dirty side of the filter position 12.2. A further overlap exists between the intermediate channel 14.3, which is also connected at the lower side of the filter support element 10, and the outlet channel 42.3 at the bottom of the housing. Thus it is possible to lead fluids from behind through the filter position 12.2 via the outlet channels 42.2, 42.3, in order to dissolve contaminants which are adhering to the filter in the filter position 12.2, and to discharge them through the back flush channel 39.2.

In the filter chambers 11.1, 11.2 shown on the right side in FIG. 3A, there is a simultaneous connection with all inlet channels 31.1, 31.2, 32.1, 32.2, respectively. In addition, the intermediate channels 13.1, 13.2 overlap with the outlet channels of the housing 41.1, 41.2. Thus it is possible to maintain the production operation with these two filter chambers 11.1, 11.2, while the other filter chambers are back flushed.

With regard to the right filter chamber 11.2, FIG. 3B shows that its intermediate channels 13.2, 13.3 are only overlapping with the right outlet channels 41.2, 41.3, but that there is no connection to the left outlet channels 42.2, 42.3.

Figure 4B:
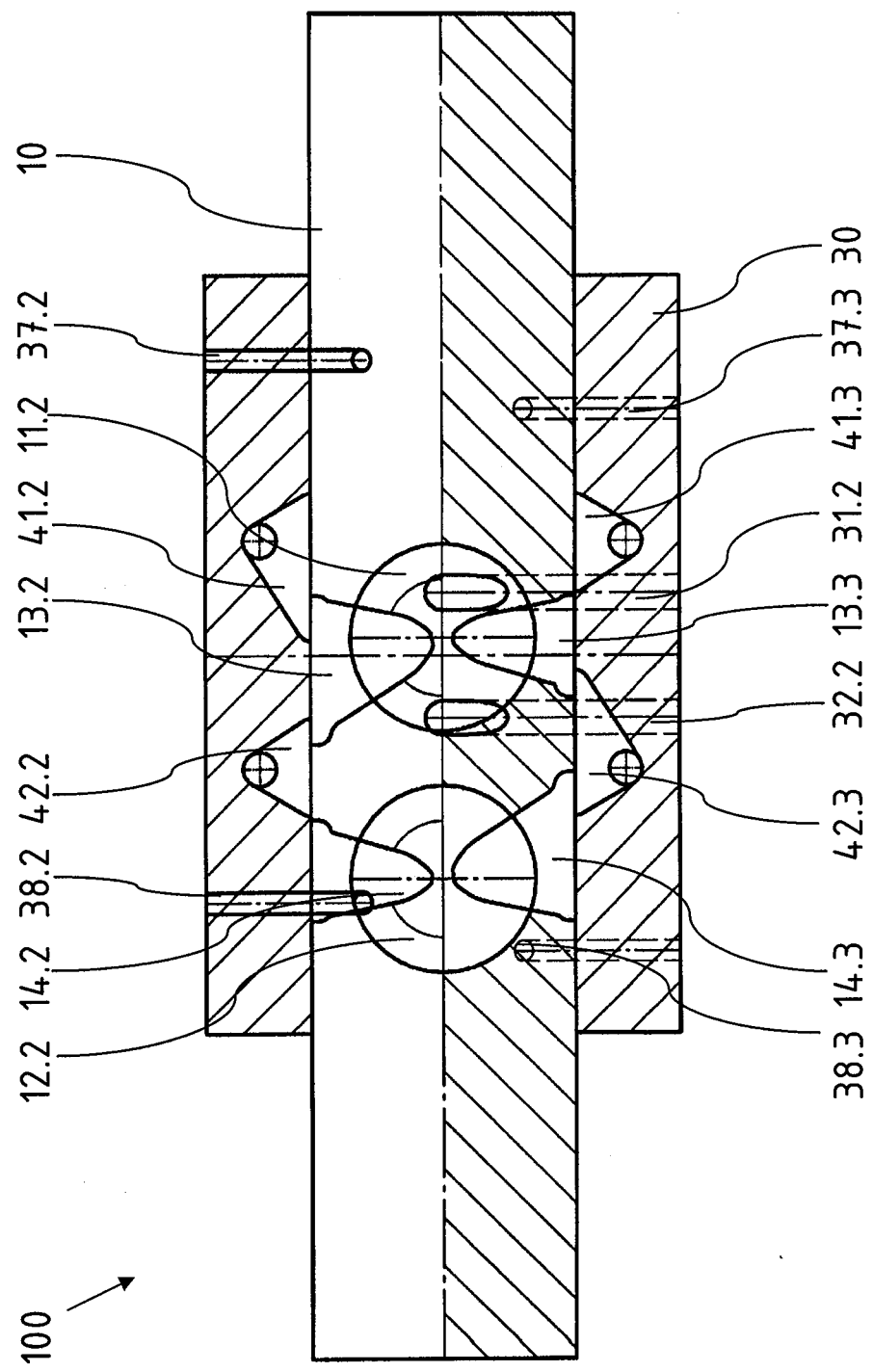
FIG. 4B a filtering device according to FIG. 4A in a second longitudinal cross section.

FIGS. 4A and 4B show that the filter support element 10 is moved out even further of the housing 30 when compared to FIGS. 3A, 3B, so that the connection between outlet channel 412 via intermediate channel 14.3 and filter chamber 12.2 is just being interrupted. No further fluid is fed into filter chamber 12.2.

As is shown in the accompanying FIG. 4B, there still is a connection to the back flush channel 39.2 on the dirty side in this position. Both filter chambers 11.1, 11.2 on the right are still in production operation. In the example shown in FIG. 4B, the fluid can still flow out from the right filter chamber 11.2 toward the top via the long intermediate channel 13.2 into the two outlet channels 41.2, 42.2 and via the short intermediate channel 13.3 at the bottom towards outlet channel 42.3.

When the filter support element 10 is moved out even further towards the left of the housing, then the lower left filter chamber 12.1 in FIG. 4A reaches its back flush position (not shown). The upper left filter chamber 12.2 is then without function, while also in the second back flush position the production operation is maintained by means of the two right filter chambers 11.1, 11.2.

In order to be able to replace or mechanically clean the filter elements, it is possible to move the filter support element 10 into a so-called filter replacement position, which is displayed in FIG. 5. The two left filter positions 12.1, 12.2 are hereby positioned freely approachable outside of the housing 30.

There is no overlapping between the filter chambers 11.1, 11.2 and the inlet channels 31.1, 31.2, 32.1, 32.2, nor between the intermediate channels 13.1, 13.2, 14.1, 14.2 and the outlet channels 41.1, 41.2, 42.1, 42.2. Thus, the production operation for this filter support element 10 is totally interrupted, while it can be maintained unabatedly for another filter support (not shown), but which is arranged on a different level, by means of at least two filter positions in it. Thus, it is possible to maintain the production operation of at least 50 percent of the total filter surface by means of this first embodiment according to the FIGS. 1A to 5 in any maintenance positions for back flushing or filter replacement.

A further embodiment of a filtering device 100' according to the invention is shown in FIGS. 6A to 8B. The arrangement of the sectional planes is similar to the depiction of the first embodiment. Also, same reference signs are used for similar characteristics of the filtering device 100'.

Figure 6B:
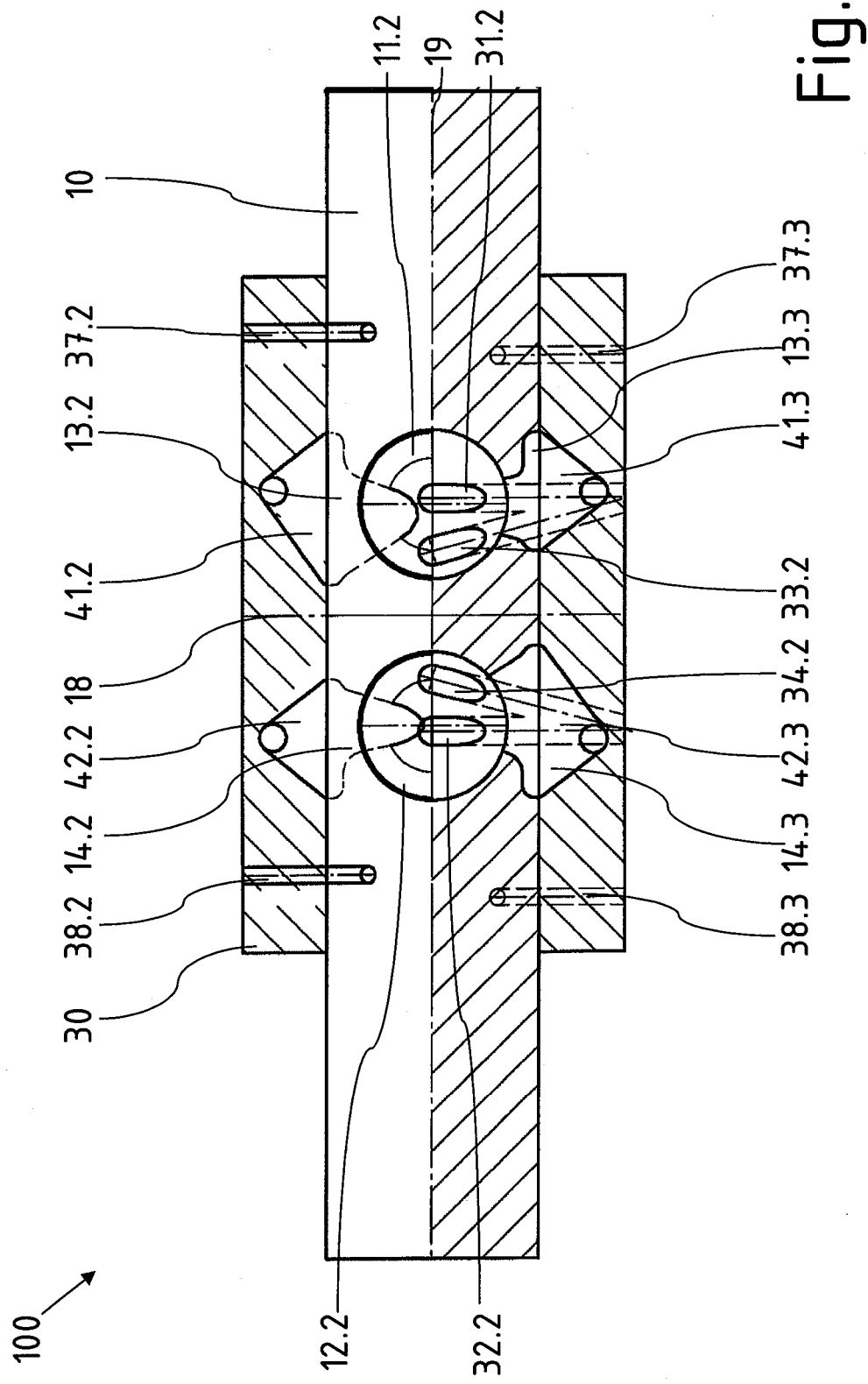
FIG. 6B the filtering device according to FIG. 6A in a second longitudinal cross section.

In FIGS. 6A and 6B, the filtering device 100' with the upper filter support element 10 is located in the production position, at which all filter chambers 11.1, 11.2, 12.1, 12.2 are flown through with fluid at the same time.

Just like in the first embodiment, the filter support element 10 consists of two pairs of filter chambers 11.1, 11.2, or 12.1, 12.2 which are arranged mirror-symmetrically opposite of each other in relation to the first transverse axis 19. The pairs of filter chambers 11.1, 11.2 or 12.1, 12.2, on the other hand, are arranged mirror-symmetrically in relation to a transverse axis 18.

At the filter support element 10 itself, intermediate channels 13.1, 13.2, 14.1, 14.2 are arranged above each respective filter chamber 11.1, 11.2, 12.1, 12.2, which extend lengthwise in the direction of the longitudinal axis 19. Also in this embodiment of a filtering device 100' there are again alternating a respective longer intermediate channel 13.2, 14.1 and a shorter intermediate channel 13.1, 14.2, by means of which intermediate channels, it is possible to establish a connection with the housing sided outlet channels. Just like in the depiction of the first embodiment 100 in FIG. 1A, the outlet channels have the same cross section shape as the intermediate channels 13.1, 13.2, 14.1, 14.2 and are located in production position in FIG. 6A congruent just above them, so that they are not detectable in FIG. 6A.

The second embodiment of a filtering device 100' involves a different formation and arrangement of the inlet channel.

The sectional view according to FIG. 6A displays two inlet channels 31.1, 33.1, 31.2, 33.2, 32.1, 34.1, 32.2, 34.2, respectively, which extend towards each of the filter chambers 11.1, 11.2, 12.1, 12.2 in a tangential way.

The channels that are arranged above and below of the longitudinal axis are hereby positioned exactly opposite of each other, in order to prevent the development of torque affecting the filter support element 10. With regard to the transverse axis 18, there are pairs of inlet channels, which again have the same distance to the transverse axis, respectively.

In the production position displayed in FIG. 6A, the ends of both inlet channels 31.1, 33.1, 31.2, 33.2, 32.1, 34.1, 32.2, 34.2 of each filter chamber 11.1, 11.2, 12.1, 12.2 lead into this one.

The other sectional view according to FIG. 6B shows the particular path of the additionally added inner inlet channels 33.2, 34.2 in contrast to the first embodiment. The inlet channel pairs 31.2, 33.2, and 32.2, 34.2 branch out in a V-shape angle of about 15° from a common branch point in or at the housing 30. This shape is easily produced, but other paths of the two inlet channels are also imaginable.

For the production position according to the FIGS. 6A and 6B, there is a doubling of the flow cross section, as a result of the additional inlet channels 31.1, 33.2, and 34.1, 34.2, but in addition to that there is no special function.

Figure 7A:
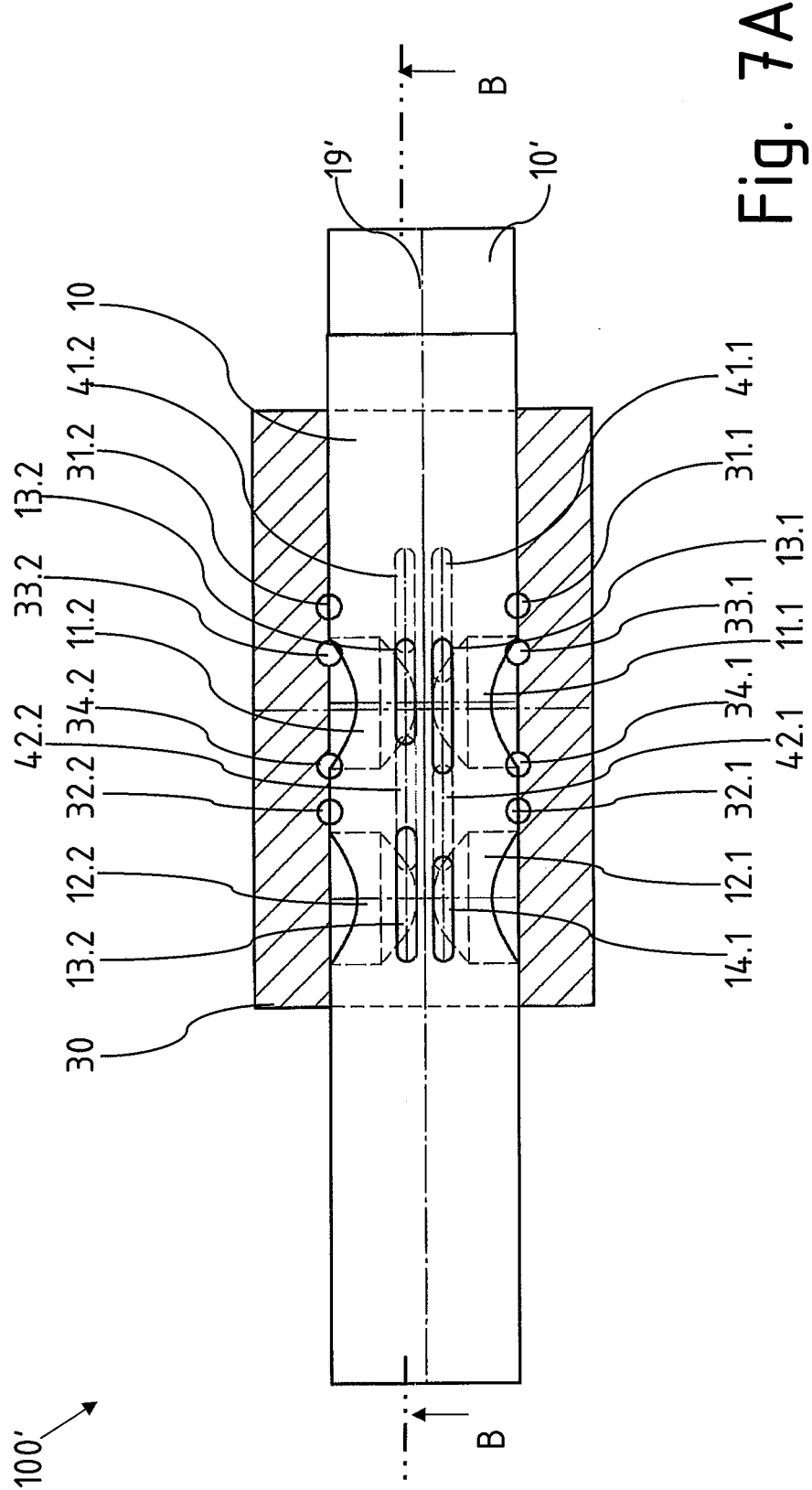
FIG. 7A a filtering device in back flush position in a first longitudinal cross section.

The FIGS. 7A and 7B show the filtering device 100' in back flush position. For this the filter support element 10 is moved toward the left along its longitudinal axis. Underneath a further filter support element 10' is shown, which is located in production position within the same housing 30.

The flowing paths now are as follows:

There is no connection between any one of the filter chambers and the outer inlet channels 31.1, 31.2, and 32.1, 32.2 anymore. These lead to the outside surface of the filter support element 10 and are thus sealed off, as it can be particularly seen also in FIG. 7B.

There exists a connection between the right filter chambers 11.1, 11.2 and the inlet channels 33.1, 34.1 or 33.2, 34.2, so that fluid can reach into the filter chambers 11.1, 11.2.

On the clean side of the filter elements, there exists a partial overlapping between the intermediate channels 13.1, 13.2, 13.3 of the filter support element 10 and the outlet channels 41.1, 41.2, 42.2 in the housing 30, as it can be particularly seen in the top view of FIG. 7A, but also in the lateral sectional view of FIG. 7B. By means of this the fluid can flow out, so that a production operation can be maintained by means of the right filter chambers 11.1, 11.2 in the FIGS. 7A and 7B, respectively.

On the other hand, the respective left filter chambers 12.1, 12.2 are blocked on the inlet side, as is particularly apparent in FIG. 7B. It is also evident that the left filter chamber 12.2 is connected to the back flush channel 38.2 in this maintenance position of filter support element 10 in FIG. 7B. On the other, there is still no connection between the left filter chamber 12.1, which is located on the opposite side of the longitudinal axis 19 (compare FIG. 7A) and the associated back flush channel 38.3. This connection is only established when the filter support element 10 is further moved towards the left.

The back flush channels 37.2, 37.3, which can be seen on the right side of the housing 30 in FIG. 7B, are intended for the back flushing of the respective right filter chambers, for which the filter support element 10 is moved towards the right. The successive back flushing of the filter chambers at different axial positions is advantageous, because in this way the existing fluid pressure from the outlet side can issue in a concentrated way onto only one filter element in one filter chamber and because less volume per time is taken away from the production flow as would be the case if both neighboring filter chambers would be back flushed at the same time. The particular advantage of the second embodiment of the filtering device 100' is detectable in the FIGS. 8A and 8B:

The so-called filter replacement position is shown there, in which the filter support element 10 is moved so far out of the housing, that the filter chambers 12.1, 12.2 are freely approachable outside of the housing 30, so that the filter elements can be taken out.

In this position of the filtering device 100' according to the second embodiment, the two right filter chambers 11.1, 11.2 continue to be in production operation. So they continue to be flown through.

With reference to FIG. 7A, the following flow path can be seen: The fluid flows via the inlet channels 32.1, 32.2 into the filter chambers 11.1, 11.2 and can be discharged from there via the intermediate channels 13.1, 13.2 into the outlet channels 42.1, 42.2.

In a filtering device 100' according to the second embodiment, which consists of only one single filter support element 10, at least 50% of the filter surface can be used even during a filter replacement.

But since preferably housings are used with two bore holes and two parallel arranged filter support elements 10, even 75% of the effective filter surface remains, when one filter support element 10' is set in production position and at the same time the other filter support element 10 is in the filter replacement position according to FIG. 8A.

Depending on the application, other kinds of operation are possible as well. For example, in case the filter replacement takes a bit longer at the one filter support element, and the filter elements in the other filter support element are getting heavily contaminated during production in the meantime, the independently operable second filter support element 10' can be back flushed at the same time. Also in this case, when both filter support elements 10, 10' are set in maintenance position, the production operation could still be maintained with at least 50% of the total filter surface.

As it can be seen in FIG. 8B, this can be accomplished in that on the dirty side there is still an overlapping between the right filter chamber 11.2 and the inlet channel 32.2 which is located on the far left outside, so that fluid can flow into it. The flow out is possible via the intermediate channels 13.2, 13.3 into the outlet channels 42.2, 42.3.

What is claimed is:

1. A filtering device for filtering fluids, said filtering device having a housing and a cylindrical bolt-shaped filter support element:
    said cylindrical bolt-shaped filter support element mounted movably in said housing and having multiple filter chambers, each of said filter chambers having a filter element,
    said housing having a plurality of inlet channels and a plurality of outlet channels configured such that each of said filter chambers moves into connection with a respective inlet channel and a respective outlet channel when said filter support element is moved to a production position,
    such that when said filter support element is in the production position a respective inlet channel in said housing leads to a respective filter chamber and each of said outlet channels in said housing leads away from a respective filter chamber, and wherein,
    said filter support element has at least two pairs of said filter chambers, each said pair comprising two filter chambers arranged diametrically opposed on said filter support element such that within said filter support element there are no connections between said filter chambers,
    said filter support element has a plurality of intermediate channels each configured to be positioned between a respective outlet channel in said housing and a respective filter chamber in said filter support element, said filter support element having a longitudinal axis, each of said intermediate channels extending in a longitudinal direction, each said pair comprising two filter chambers having two respective intermediate channels of different longitudinal length, such that:
    when said filter support element is in said production position, each filter chamber of one of said pairs is connected with at least one of said inlet channels and with at least one of said outlet channels, and
    said filter support element is moveable to a maintenance position in said housing, and when said filter support element is in the maintenance position one or the other filter chamber of one of said pairs is connected reciprocally with at least one of said outlet channels.

2. The filtering device according to claim 1, wherein said intermediate channels are formed at an outside surface of said filter support element.

3. The filtering device according to claim 1, wherein said intermediate channels are formed as slotted hole shaped grooves.

4. The filtering device according to claim 1, wherein said intermediate channels are formed by rows of individual recesses.

5. The filtering device according to claim 1, characterized in that in cross section
    two of said inlet channels have outlets that open respectively to two of said filter chambers and that are located at opposing sides of said filter support element and that are arranged on a symmetrical axis on a first diameter line, and
    two of said outlet channels lead from each filter chamber to opposing sides of the filter support element and have outlets arranged on a symmetrical axis on a second diameter line, such that the second diameter line extends perpendicular to the first diameter line.

6. The filtering device according to claim 5, wherein said filter chambers and said inlet channels of one of said pairs are mirror-inverted relative to said filter chambers and said inlet channels of the other of said pairs, in relation to a first transverse axis extending laterally through said filter support element.

7. The filtering device according to claim 6, wherein said outlets of said inlet channels leading to said filter chambers of both said pairs are arranged mirror-symmetrically in relation to the first transverse axis.

8. The filtering device according to claim 1, wherein said intermediate channels include two longer intermediate channels and two shorter intermediate channels, said two longer intermediate channels located on different sides of a first transverse axis, said two shorter intermediate channels located on different sides of the first transverse axis, said two longer intermediate channels located on different sides of a longitudinal axis of the filter support element, and said two shorter intermediate channels located on different sides of the longitudinal axis.

9. The filtering device according to claim 8, wherein said intermediate channels are configured such that a line connecting centers of said longer intermediate channels intersects a line connecting centers of said shorter intermediate channels at an intersection point of the first transverse axis and the longitudinal axis.

10. The filtering device according to claim 1, further comprising a second cylindrical bolt-shaped filter support element movably mounted in said housing, each of said filter support elements having two pairs of filter chambers.

11. The filtering device according to claim 1, wherein said housing has at least one back flush channel configured to move into connection with at least one of said filter chambers to arrange said filtering device in a back flush maintenance position.

12. The filtering device according to claim 1, wherein said housing has a pair of inlet channels configured to be connected to each filter chamber, such that each pair of inlet channels have outlets that are longitudinally offset in relation to each other.

13. The filtering device according to claim 12, wherein said two inlet channels of each pair branch out in a V-shape.

* * * * *